UNITED STATES PATENT OFFICE.

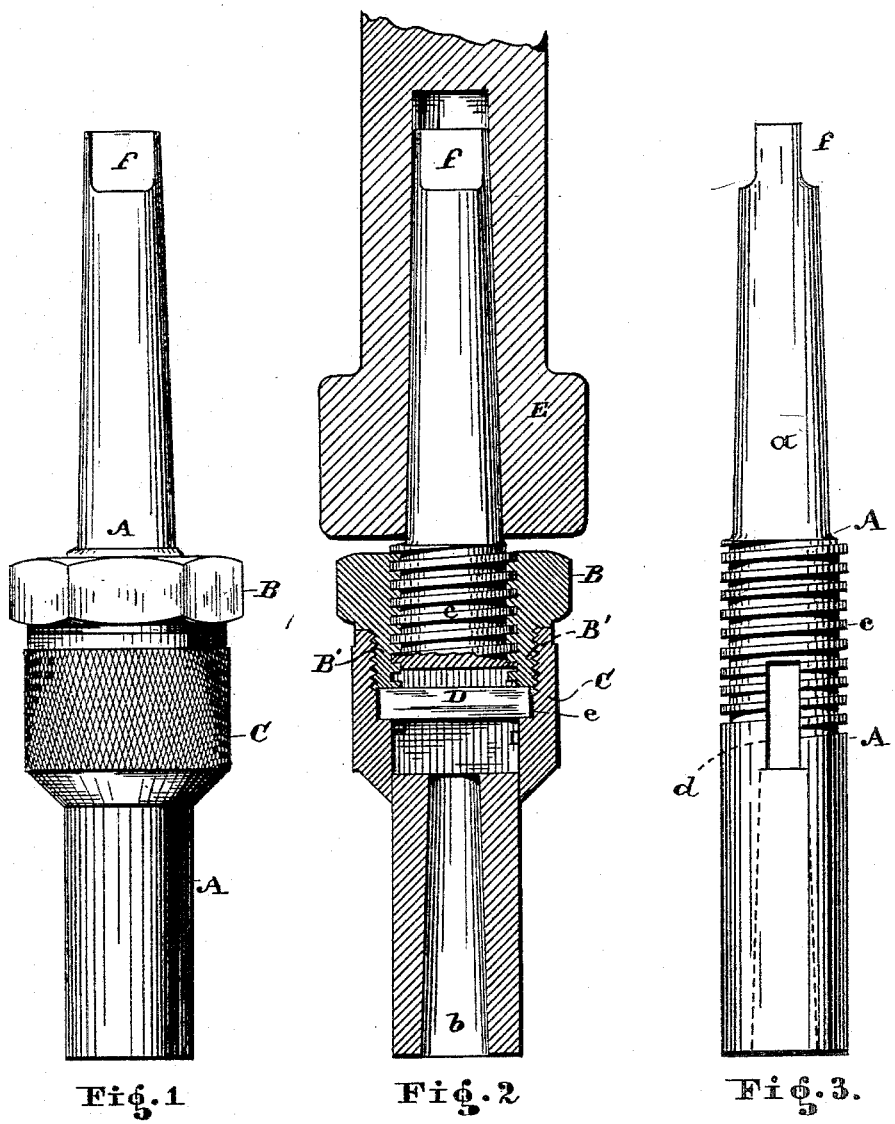

GEORGE W. McINTYRE, OF CLEVELAND, OHIO.

DRILL-CHUCK.

SPECIFICATION forming part of Letters Patent No. 388,987, dated September 4, 1888.

Application filed July 14, 1888. Serial No. 279,944. (No model.)

*To all whom it may concern:*

Be it known that I, GEORGE W. MCINTYRE, of Cleveland, in the county of Cuyahoga and State of Ohio, have invented a new and useful Improvement in Drill-Chucks; and I do hereby declare that the following is a full, true, and exact description thereof.

My invention consists in the peculiar construction of the drill-chuck for rendering it to be readily taken out from the spindle of the drill presses or lathes in connection with which the chuck is to be used, and also for taking the drill out of the chuck.

That the improvement may be fully understood, reference will be had to the following specification and the accompanying drawings, in which—

Figure 1 is an outside view of the said drill-chuck. Fig. 2 illustrates a partial central section of the same, and Fig. 3 is an exterior view of the drill-stock only.

Like letters of reference refer to like parts in the drawings and specification.

A in Fig. 1 represents the drill-stock, the upper part of which is conical or tapering, as seen at $a$, to fit into the drill-press spindle or lathe in connection with which the chuck is to be used. The lower or cylindrical part of said stock contains the socket $b$, into which the drill is to be inserted. On the central part of the stock is a screw, $c$, and a slot, $d$, as seen in Figs. 2 and 3. The nut B is arranged for engagement with the screw $c$, and also to be connected with the sleeve C by means of a screw-thread on the exterior of the extension B' thereof, as seen in Fig. 2, which is threaded into the interior of the sleeve.

Below the interior screw-thread of the sleeve C is a recess, $e$, which forms a groove in connection with the nut B. The bar D extends through the slot $d$ and projects into said groove, as seen in Fig. 2, and in turning the nut B either one way or the other the bar D is carried up or down within the slot $d$.

The drills which are used in connection with this chuck are at their upper conical ends flattened in like manner as the stock A at $f$ is. This flat part, when the drill is inserted, will extend into the slot $d$ and prevent the drill from slipping when put into operation. To extract the drill from out the socket, all that is necessary is to turn down the sleeve C, which will bring the cross-bar D in contact with the drill and loosen the same from the socket $b$.

On turning the nut B in reverse direction, then the same will travel toward the tapering part of the stock A and pry it from out the socket of the drill-spindle E, Fig. 2, when brought in contact with the head thereof. The sleeve C is roughened on the outside to facilitate turning of the same.

In case the drill should be so tightly held in the socket as not to be removed by the means described, then a wrench may be applied to the nut B and turned with such force as to remove the drill. The same mechanism as described for removing the drill from a drill-chuck may be employed directly in connection with the head of drill-press spindles for releasing the drill therefrom when required without departing from the nature of this invention.

What I claim, and desire to secure by Letters Patent, is—

1. A drill-chuck consisting of the stock A, nut B, sleeve C, and cross-bar D, the nut being screw-threaded to the exterior of said stock and interior of the said sleeve, and forming with the sleeve an annular groove to receive the ends of the said bar moving in a slot of said stock, all substantially as and for the purpose described.

2. In a drill-chuck, the stock having a slot in open relation with the socket for the drill, and a screw-thread on the central part thereof, in combination with a bar projecting through said slot, and a nut carrying a sleeve for moving said bar, substantially as shown and set forth.

In testimony whereof I affix my signature in presence of two witnesses.

GEORGE W. McINTYRE.

Witnesses:
W. H. BURRIDGE,
B. F. EIBLER.